Nov. 14, 1967  K. BECKER ETAL  3,352,397
DEVICE FOR CONTROLLING THE SPEED OF MOVEMENT OF AN OBJECT
Filed July 7, 1965  4 Sheets-Sheet 1
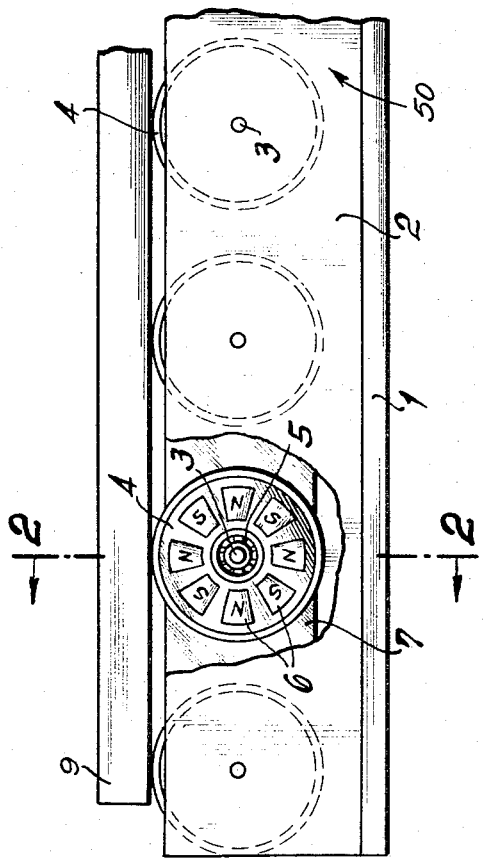
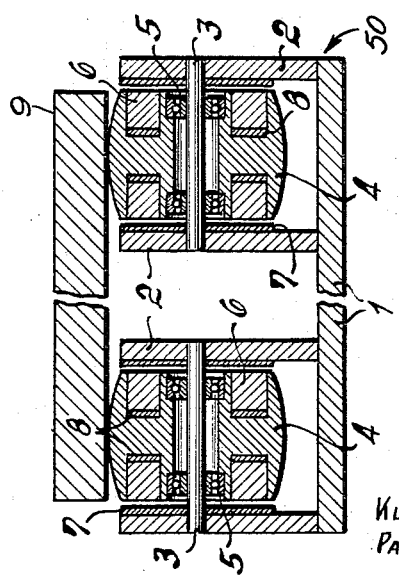
INVENTORS
KLAUS BECKER
PAUL MERTENS
By: McGlew and Toren
ATTORNEYS Nov. 14, 1967 K. BECKER ETAL 3,352,397
DEVICE FOR CONTROLLING THE SPEED OF MOVEMENT OF AN OBJECT
Filed July 7, 1965 4 Sheets-Sheet 2
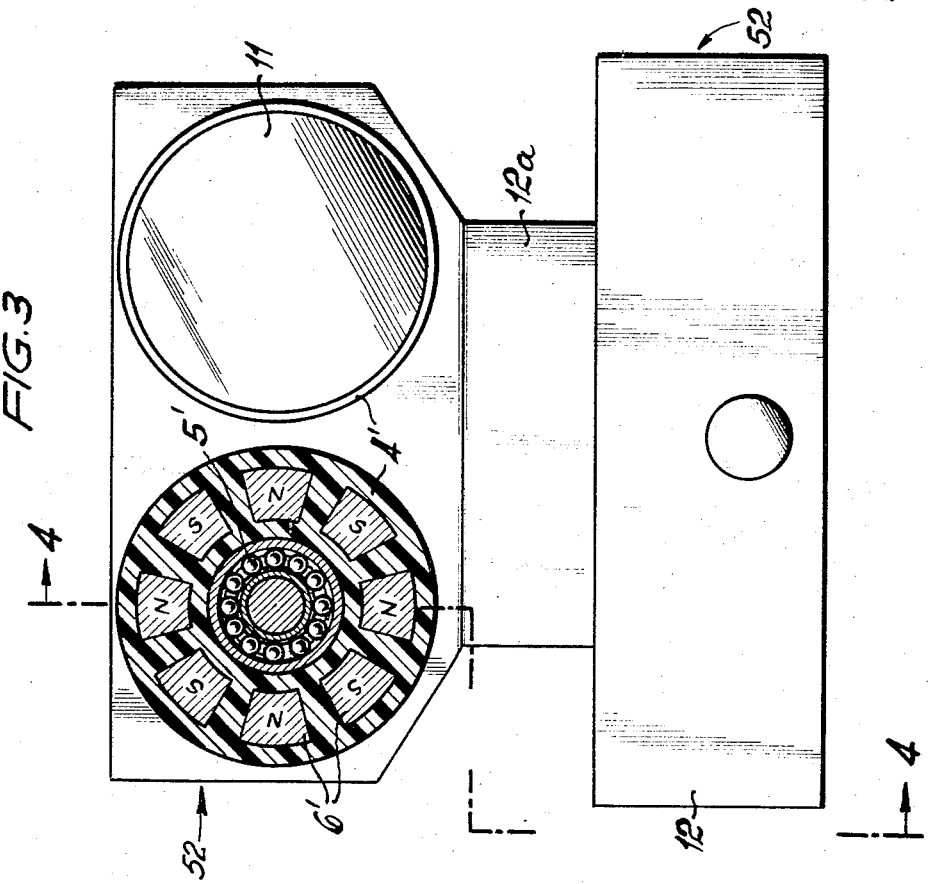
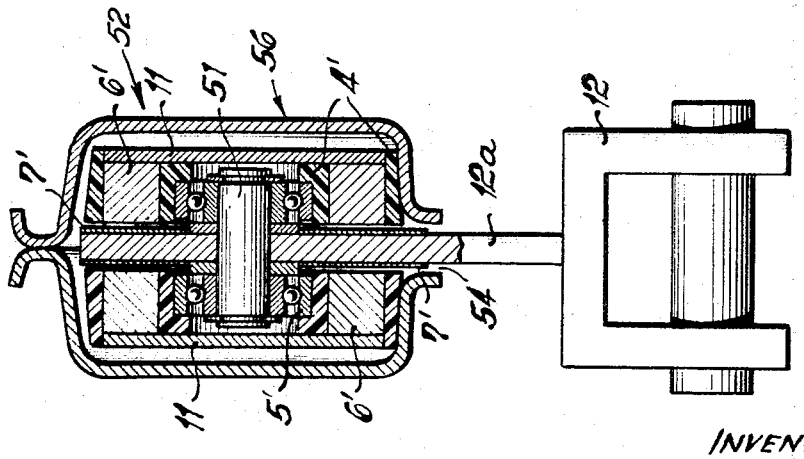
INVENTOR
KLAUS BECKER
PAUL MERTENS
By: McGlew and Toren
ATTORNEYS

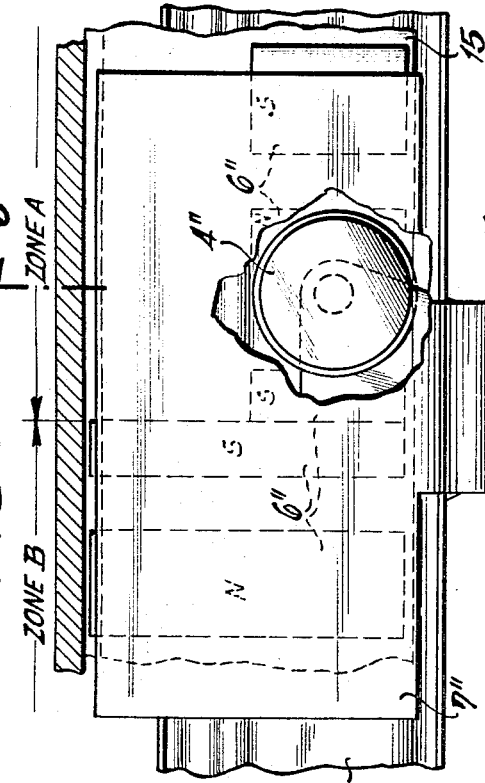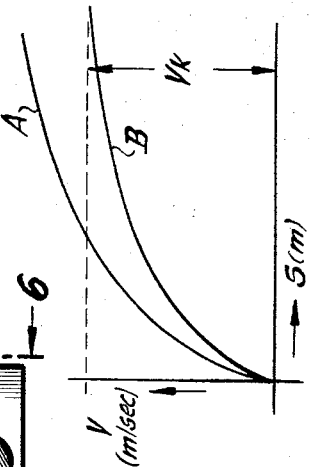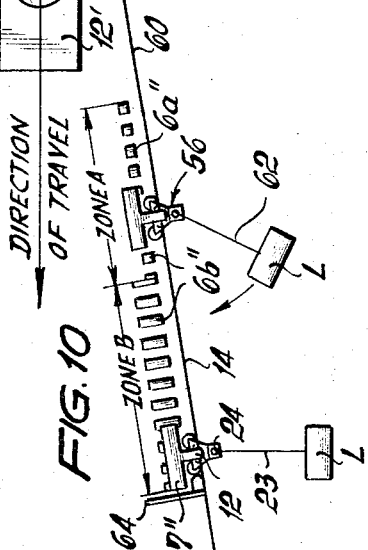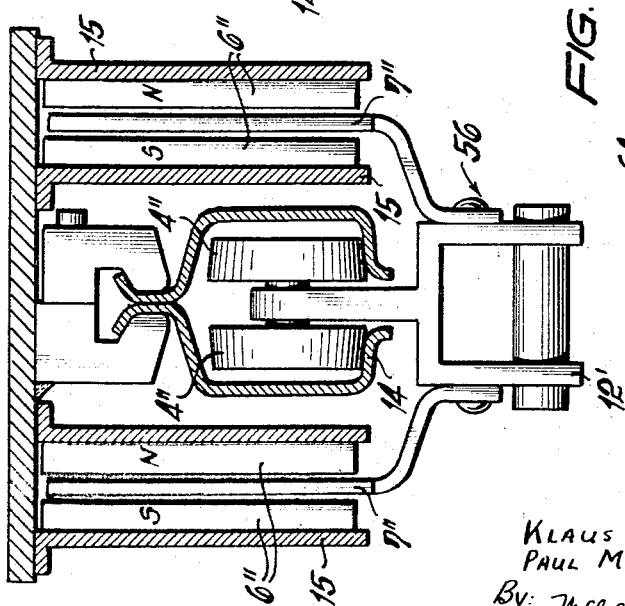

Nov. 14, 1967 K. BECKER ETAL 3,352,397
DEVICE FOR CONTROLLING THE SPEED OF MOVEMENT OF AN OBJECT
Filed July 7, 1965 4 Sheets-Sheet 4
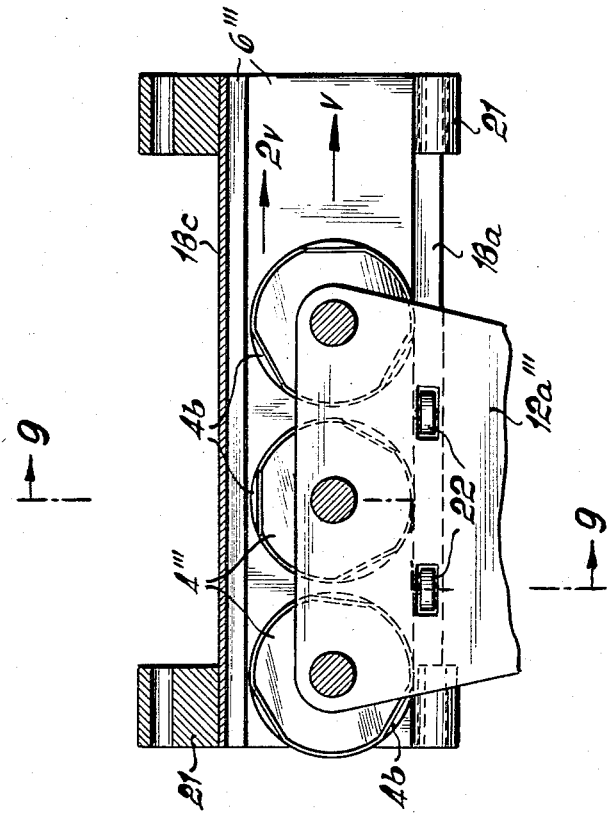
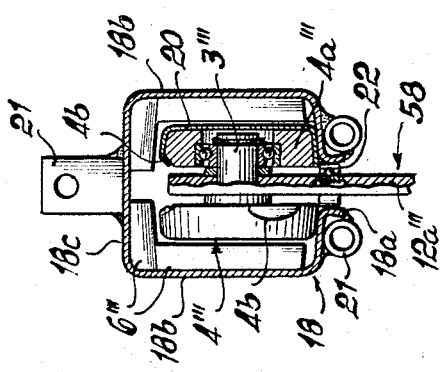
INVENTORS
KLAUS BECKER
PAUL MERTENS
By: McGlew and Toren
ATTORNEYS

3,352,397
DEVICE FOR CONTROLLING THE SPEED OF MOVEMENT OF AN OBJECT

Klaus Becker and Paul Mertens, Wetter, Ruhr, Germany, assignors to Demag-Zug G.m.b.H., Wetter, Ruhr, Germany
Filed July 7, 1965, Ser. No. 470,137
Claims priority, application Germany, July 8, 1964, D 44,873; Oct. 24, 1964, D 45,716; Mar. 4, 1965, D 46,683
10 Claims. (Cl. 193—35)

This invention relates, in general, to roller conveyors and, in particular, to a new and useful braking device for such conveyors.

The invention is particularly applicable to conveyor devices of a type which include a trolley or other element which is movable over rollers or an article which is supported and moved on a roller trackway. When articles are guided over rollers forming a roller conveyor or along a trackway upon which they are suspended by rollers, it is desirable that they automatically continue to roll to a dispensing station under the influence of gravity and move there as soon as the dispensing station becomes free. It is usually necessary to provide for a certain inclination of the conveyor track therefore. In order to prevent the conveyed material or it conveying elements from obtaining too high a speed on a long inclined runway and to prevent it from running into an object, it is desirable to provide means along the track for retarding the device. Up to the present time, such means have the disadvantage that the conveyed material or its carrying organ cannot run or roll by itself if it has been stopped in a braking station, for example. It is known to insert along inclined roller tracks at critical points, braking elements which are operated by centrifugal force, for example. Such elements have difficulty in adapting themselves to the speed of the conveyed material and consequently, they slow up the speed thereof to a great amount. In addition, the rollers which are mounted with the braking devices are usually prone to rapid deterioration and wear.

In accordance with the present invention, there is provided a braking device for roller conveyed material which includes electromagnetic means or magnetic means which are associated with the roller conveyor at locations in order to effect the desired braking movement by action upon magnetic portions carried either on the stationary trackway portion or on the moving roller elements. It has been found by providing magnetc at spaced relation along the trackway or in the rollers that a slowing movement can be effected in accordance with the speed of the device which is being conveyed. The construction of the braking device, according to the invention, includes either an electromagnetic or permanent magnet braking device which operates automatically and without contacting or control elements and dependent upon the speed of the moving object. The magnets are spaced along the trackway or actually carried on the moving element and are actuated by relative movement of the conveyed device and the trackway. There is no actual contact of the parts and no wear and resultant servicing will be incurred. The brake device of the invention will act with a brake force which increases with an increase of the speed of the conveyed material. This is true because at a standstill of the conveyed material there is no braking action by the magnets. The desired inclination of the conveyor track can be determined only by the bearing resistance of the running rollers or the rollers of the trolley element which moves on a fixed track. With the device, it is possible to ensure that the conveyed material will be moved along a roller trackway at a certain speed without exceeding a predetermined speed. The braking device may be constructed so that the materials may be braked in a desired crucial zone but permitted to move freely again after they are once stopped by the braking system.

In accordance with one embodiment, the conveyor advantageously includes a fixed track of nonmagnetic material, for example, aluminum, plastic or the like over which is movable on rolls the device to be conveyed. The rolls advantageously include permanent magnets which are disposed opposite stationary magnetic plate elements on the trackway so that as the rolls rotate at increasingly higher speed, the magnetic attraction between the magnets between the roll and the fixed plate elements will be increased to increase the braking action. Of course, a similar effect can be obtained with the reverse arrangement, that is, with the magnets maintained in the fixed trackway. In such a case, the roller elements include a magnetically attractable element such as a magnetic metal material, for example, copper plates or sheets to provide the magnetic flux with the magnets at the trackway to cause the necessary braking action.

The magnets may be arranged so that they present alternate opposite polarity along the trackway or in respect to radial positioning of magnets on the roller elements. In some instances, it is desirable to include magnets which operate along the complete trackway such as for carriages, trolleys, and the like in which case the carriage is used as a shield or as a magnetic support in order to obtain the necessary magnetic attraction with a stationary element. In some instances, it is desirable that the electromagnetic braking or strictly magnetic braking is to be operative only at certain points along the inclined track. In such an instance, either fixed permanent magnets or electromagnets or copper and steel plates, as the case may be, are arranged at such locations along the track. When electromagnets are employed, it may be desirable to provide for selective actuation in order to achieve different braking effects at different locations.

In many instances, it is desirable to make the brake section as short as possible in order to increase the brake effect of the device without lengthening the brake section. In the development of the invention, this is obtainable for trolleys and the like by providing both the roll flank and the roll rim with non-magnetic electrically conducting material and by employing permanent magnets or electromagnets of alternate polarity along the runway proceeding in a running direction. With such a construction, it is usual to provide that the rims of the running rolls be magnetically attractable for braking purposes. Since for a running speed V of a trolley the relative movement at the upper roll summit in respect to the magnetic surfaces below the roll equals 2V and since the brake effect increases with the speed with which the lines of force are intersected, the braking action of the device is thus very greatly increased. Preferably, the surfaces forming the roll flank and the rim are formed on a common sheet metal hood of aluminum, copper and the like.

The rail section which serves as a brake station and which is equipped with brake magnets can, in accordance with the invention, be made relatively short. This is especially true for the magnets connected with the inner walls of the rail and wherein the profile of the rail section differs in height and width from the actual running rail profile. Advantageously, this rail section is provided at least at one end with directional guides for the running rolls and with connecting elements for the junction with the running track rail. The direction guides may, as the practice has taught, be eliminated if the trolley mechanisms are provided with supporting rolls rotatable about their vertical axes. If their outside diameters are made slightly smaller than the slot width of the suspended track rail, only two guide rolls mounted at the same level are required.

The brake station may be constructed to provide for a moderate braking as the trolley or carriage enters the station to cause a slowing down of the device and a swinging of a suspended load which, in turn, will reduce the speed on the conveyed device or carriage substantially to a standstill. For this purpose, there is advantageously provided at least two brake zones of different brake force lying one alongside the other with the one at the extreme end of the running track having the greater braking force. With such as construction, the brake device provides for the swinging of the load in the end station to cause the device to come to rest. This permits the load to be put down or lowered immediately. Another possibility similar to this, would be to provide two brake zones of equal areas but having different magnetic inductions so that the second zone has the greater induction causing the final stopping action therein. Braking to provide the swinging motion of the load will depend on a number of considerations, but usually depends on the force applied in the first braking zone, the mass of the trolley and the load as well as the swinging length.

All of these values may be assumed to be constant in the systems in question so that always the same conditions will apply for each system. Thus, once the system has been worked out initially, the movement of the trolley will be slowed down to a point at which the swinging of the load will take place which will cause the complete stopping of the trolley.

Accordingly it is an object of the invention to provide an improved braking device for conveyors using a magnetic braking force by magnetic fields located along the trackway as produced by the moving object and the trackway.

A further object of the invention is to provide a braking device for braking articles which are conveyed such as along roller conveyors under the influence of gravity which utilizes magnetic fields produced between the moving article and the fixed trackway.

A further object of the invention is to provide a braking station with various magnetic braking effects produced by variations in magnetic fields set up between a magnetic circuit completed by the article being conveyed and the fixed trackway.

A further object of the invention is to provide a device for braking roller elements, trolleys, and the like, which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a partial sectional view and end elevational view of a portion of a roller conveyor constructed in accordance with the invention;

FIG. 2 is a section taken on the line 2—2 of FIG. 1;

FIG. 3 is a partial side elevational and partial sectional view of a trolley constructed in accordance with the invention;

FIG. 4 is a section taken on the line 4—4 of FIG. 3;

FIG. 5 is a view similar to FIG. 3 of another embodiment of the invention;

FIG. 6 is a section taken on the line 6—6 of FIG. 5;

FIG. 7 is a curve showing the braking action on the speed of a conveyed article in respect to an article which has no braking action;

FIG. 8 is a partial side elevational and partial sectional view of a trolley braking station;

FIG. 9 is a section taken on the line 9—9 of FIG. 8; and

FIG. 10 is a somewhat schematic side elevational view indicating the arrangement of the magnetic braking zones.

Referring to the drawings, in particular, the invention as embodied in FIGS. 1 and 2 comprises a roller conveyor generally designated 50 having a base 1 with upstanding frame members 2, 2 forming journals for a shaft 3 of the rollers. Rollers 4 are rotatably mounted on the shaft 3 through ball bearings 5.

In accordance with the invention, the rolls 4 are advantageously made of non-magnetic material, for example, plastic or aluminum. In one or more of the rolls 4, there are provided permanent magnets 6 which are inserted into axially extending bores defined in an end face and are arranged, for example, in equally spaced radial locations. In the embodiment illustrated, the magnets 6 are arranged with alternate polarities on a common end face of the roller proceeding circumferentially. The supporting walls 2 are advantageously covered with copper sheets and they form the outer magnetic flux return for the adjacent magnets of the rollers 4. The inner flux return is formed by a magnetically conducting ring 8 which is arranged in each of the bores carrying the magnets in the rollers 4.

When the rollers are rotated as by an object 9 being moved thereover, the eddy currents which are produced by the magnetic fields which are set up between the magnets and the copper shield 7 increase as the angular velocity of the roll increases. The dimensions of the rolls can be so maintained such that an object 9 sliding at a low speed over the rolls will be practically not braked at all, while an object moving with an excessive speed will brake very effectively.

In the embodiment indicated in FIGS. 3 and 4, the magnets are advantageously maintained in the moving element, which in this instance, comprises a trolley generally designated 52. The trolley 52 includes rollers 4' having permanent magnets or electromagnets 6' therein which are arranged with alternate opposite polarities proceeding circumferentially as indicated in the drawings. The rollers 4' are rotatably mounted on ball bearings 5' as in the previous embodiment. The ball bearings 5' are carried on an axle or shaft 51 which is journaled in a plate 12a which depends through a slot 54 in a guide rail generally designated 56. The lower portion of the plate 12a is secured to a securing pulley or similar element 12.

Each of the rollers 4' is provided with external or end discs or rings 11 of magnetically well conducting material which provides for an interflux return. The outer magnetic flux return occurs through a steel shield 12a of the trolley 50 which in the vicinity of the magnets 6' are provided with copper discs or plates 7'. In contrast to the embodiment of FIGS. 1 and 2 when the braking action occurs, it will occur only at the locations which are fitted with the rolls having the magnets 6' therein according to the invention. Thus, any trolley 52 which is provided with such rolls will have a braking action over its entire running path. Its end speed will be dependent on the suspended load and on the inclination of the track and is limited by such an arrangement. Another advantage is that the traveling rail has no parts which belong to the brake effect so that the trolleys automatically brake on every inclined track.

In FIG. 7, there is indicated a curve showing the speed increase in the case of trolleys equipped with the brake device as compared with the speed increase of a freely running trolley. The latter is represented by curve A which is a parabola. Curve B applies to the trolleys with the steady electromagnetic braking. While in curve A the speed V increases with the path of distance S theoretically to infinity of the speed, braked trolleys moving according to the curve B approaches essentially a constant final speed $V_k$.

A modification of the electromagnetic braking for trolleys or carriages traveling on inclined tracks is shown in FIGS. 5 and 6. In this embodiment, a trolley generally designated 56 is provided with a central plate portion 12' having rollers 4" which ride on an internal rail structure or track generally designated 14. The trolley 56 also includes side plates 7", 7", which extend upwardly and are disposed for running between opposite magnets 6" arranged on each side thereof and carried by magazine or plate elements 15 which depend from an overhead supporting plate 17. A suspension clamp 16 is also secured to suporting plate 17 and carries the upper end of the rail 14. The magnets 6" are fixed and may be either permanent magnets or electromagnets.

The construction indicated in FIGS. 5 and 6 is particularly suitable for end brakes stations. An example of such a station is indicated in FIG. 10 in which the braking stations includes two braking zones $6a''$ and $6b''$ for zones A and B, respectively. The trolley 56 advantageously includes conducting plates 7" which lie in a plane parallel to the trolley track 14 and they are preferably made of copper or aluminum. The magazine 15 includes magnetically conducting plates which are arranged opposite to the magnets 6" and provide the innerflux return.

In the embodiment of FIGS. 8 and 9, there is provided a suspension track rail generally designated 18 which forms a brake station and is substantially rectangular in end elevation. The rail 18 is provided with a central slot 19' through which a plate element $12a'''$ extends for supporting a trolley generally designated 58. The trolley 58 includes rollers $4'''$ which ride on the rail 18 and which are rotatable on a shaft $3'''$. Webs $18a$ of the track limit the extent of the slot defined therebetween. On both sides of each web $18a$ are located the traveling tracks which are inclined a little toward the center and for the running rollers $4'''$ which are similarly inclined. The body $4a'''$ of the rollers $4'''$ is of soft iron and is clad by an aluminum sheet cap 20. The cap 20 is attached by means of camfer-like sections $4b$ at the periphery of the inner flank of the rail 18. The edge of the cap 20 is pressed into these sections $4b$ so that the latter is firmly connected with the roll body $4a'''$. The profile of rail 18 is so dimensioned that on the inner faces of its side walls $18b$ and of the upper wall $18c$ permanent magnets or electromagnets $6'''$ can be fastened. In this embodiment the magnets $6'''$ are arranged on the interior of the internal trackway 18. The magnets $6'''$ are located on each side of and above the rolls so that the eddy currents for braking action are provided with connecting lugs or eye members 21 for conflux which is produced is greater when the speed of the trolley 52 traveling through the station is greatest. The brake magnet 6 may be made as long as the rail section 18 or instead several individual shorter magnets may be arranged in the direction of travel at a spaced location from each other. The rail section 18 is advantageously provided with connecting lugs or eye members 21 for connecting the rail member to another supporting structure. For shock-free traveling and for the alignment of the rolls $4'''$ in the rail 18, the shield $12a'''$ is provided with supporting rollers 22. This ensures that the air gaps between the rolls $4'''$ and the magnets $6'''$ are kept constantly small throughout the entire brake device.

For a trolley traveling at speed V, the relative movement at the upper roll summit in relation to the magnet surfaces thereabove is 2V. In this construction of the brake station therefore, the brake effect is much increased over that of the previous embodiments.

In the zone arrangement of FIG. 10, braking effects of different intensity may be obtained. For example, in zone A relatively small sized magnets $6a''$ are provided, whereas in zone B relatively large magnets $6b''$ are provided. The trolley 56 rolling down the inclined trackway 60 carries a swinging load L at the end of a cable or rope 62. When the forward traveling speed of the trolley decreases upon entering the zone A of relatively small magnetic braking effects because of the inertia acting on the trolley 56, the load L swings forward. When the load L swings back, the trolley is so strongly braked by the second braking zone B during the first portion of this swing that it causes the trolley 56 to come to a complete standstill in which the load is again perpendicularly or almost perpendicularly suspended below the point indicated 24 in FIG. 10 at which point the car may be arrested such as by a fixed bumper 64.

While specific embodiments of the invention have been shown and described in detail to illustrate the application of the inventive principles, it will be understood that the invention may be embodied otherwise without departing from such principles.

What is claimed is:

1. A device for controlling the speed of movement of an object, comprising a trackway, an object movable along said trackway, roller means between said object and said trackway providing roller movement of said object along said trackway, said trackway, said object and said roller means including magnet means on at least one thereof and magnetically conductive plate means on one of the others thereof which are maintained in spaced out-of-contact relationship during movement of said object along said trackway and which define a magnetic field which is cut by the relative movement between said magnet means and said plate means upon movement of the object along the trackway and a rate which is varied by the rate of relative movement between said object and said trackway for retarding the advance of said object along said trackway.

2. A device for controlling the speed of movement of an object, comprising a trackway having a plurality of rollers defined along the length thereof over which an object is movable and including at least one roller with a face having a plurality of magnets spaced around said face and of alternate polarity proceeding circumferentially, magnetically conductive plate means disposed along said trackway and maintained in spaced out-of-contact relationship with said magnets during movement of said object along said trackway, said magnetic plate means and said magnets defining a magnetic field between said magnets and said magnetically conductive plate means which is cut by the relative movement between said magnets and said magnetically conductive plate upon movement of the object along the trackway and at a rate which is varied by the rotative speed of the roller bearing said magnets.

3. A device for controlling the speed of movement of an object comprising a trackway, an object movable along said trackway having at least one roller in rolling engagement with said trackway, said trackway and said roller including magnet means on one and magnetic conductive plate means on the other which are maintained in spaced out-of-contact relationship during movement of said object along said trackway and which define a magnetic field between said magnet means and said magnetically conductive plate means which is cut by the relative movement between said magnet means and said magnetically conductive plate means upon movement of the object along the trackway and at a rate varied by the relative speed of said rollers.

4. A device for controlling the speed of movement of an object comprising a trackway, an object movable along said trackway, at least one roller carried by said object and arranged in rolling engagement with said trackway, said roller having a face with a plurality of spaced magnets thereon of alternate polarity proceeding circumferentially, said object including a magnetically conductive plate maintained in spaced out-of-contact relationship in respect to said magnets and defining a magnetic field between said plate and said roller, which is cut by the relative movement between said roller and said plate upon movement of the object along the trackway and at a rate which is varied by the rotative movement of said roller for retarding the advance of said object along said trackway.

5. A device for controlling the speed of movement of an object comprising a housing defining an interior trackway, a trolley having a portion extending into said housing, at least one roller on said trolley portion in rolling engagement on said trackway for permitting rolling movement of said object relative to said trackway, magnet means defined along said trackway and extending in direction of movement of said object, said trolley having a plate of magnetic material maintained in out-of-contact spaced relationship with said magnet means during movement of said object along said trackway, said magnet means and said plate together defining a magnetic field which is cut by the relative movement between said roller and said magnet means upon movement of the object along the trackway and at a rate which is varied by the relative movement by said object along said trackway for retarding the advance of said object along said trackway.

6. A device for controlling the speed of movement of an object comprising a trackway an object movable along said trackway and including at least one roller in rolling engagement on said trackway for permitting rolling movement of said object relative to said trackway, said object including a side plate extending outwardly from each side, magnets of alternate polarity arranged along the path of movement of said object in spaced relationship on each side of each of said side plates, said magnets and said plates together defining a magnetic field which is cut by the relative movement between said magnets and said plates upon movement of the object along the trackway and at a rate which is varied by the relative movement by said object along said trackway for retarding the advance of said object along said trackway.

7. A device for controlling the speed of movement of an object comprising a trackway, an object movable along said trackway and including at least one roller in rolling engagement on said trackway for permitting rolling movement of said object relative to said trackway, magnet means defined along said trackway and extending in direction of movement of said object, said magnet means including a magnet disposed on each side and at least one end of said roller, said roller having a magnetic plate extending along the side and end thereof opposite to said magnet means, said magnet means and said plate together defining a magnetic field which is cut by the relative movement means and said plate and said magnet means upon movement of the object along the trackway which is varied by the relative movement by said object along said trackway for retarding the advance of said object along said trackway.

8. A device for controlling the speed of movement of an object comprising a trackway, an object movable along said trackway, roller means between said object and said trackway providing roller movement of said object along said trackway, said roller means including a roller having an end face having a plurality of magnets of alternate polarity arranged in spaced location therearound proceeding circumferentially, a conductive plate held in a fixed position on at least one of said trackway and said object in respect to said roller and maintained in spaced out-of-contact relationship with said roller and said magnet during movement of said object along said trackway, said conductor plate and said magnets together defining a magnetic field therebetween which is cut by the relative movement between said roller means and said conductive plate upon movement of the object along the trackway and at a rate which is varied in accordance with the speed of movement of said object along said trackway for retarding the advance of said object along said trackway.

9. A deviation for controlling the speed of movement of an object comprising a trackway, an object movable along said trackway, a plurality of rollers rotatably mounted along said trackway providing roller movement for said object along said trackway, at least some of said rollers including an end face having a plurality of magnets of alternate polarity arranged in spaced locations therearound proceeding circumferentially, a conductive plate held in a fixed position on said trackway and maintained in spaced out-of-contact relationship with said rollers and said magnets during movement of said object along said trackway, said conductor plate and said magnets together defining a magnetic field therebetween which is cut by the relative movement between said rollers and said conductive plate upon movement of the object along the trackway and at a rate which is varied in accordance with the speed of movement of said object along said trackway for retarding the advance of said object along said trackway.

10. A device for braking an object comprising, a trackway, an object movable along said trackway, said trackway and said object including a movable part on one and a fixed part on the other maintained in spaced out of contact relationship and defining spaced elements possessing a magnetic field which is cut by the relative movement between said spaced elements upon the movement of the object along the trackway, the movable one of said parts being movable at a rate in accordance with the speed of movement of said object along said trackway to vary the magnetic influence between said spaced elements for retarding the advance of the object along the trackway.

References Cited
UNITED STATES PATENTS 1,812,190   6/1931   Baseler _____ 105—77

FOREIGN PATENTS 1,052,313   3/1959   Germany.
86,789   11/1957   Netherlands.

EVON C. BLUNK, *Primary Examiner.*

A. L. LEVINE, *Examiner.*

A. C. HODGSON, *Assistant Examiner.*